US010865632B2

(12) United States Patent
Harrigan

(10) Patent No.: US 10,865,632 B2
(45) Date of Patent: Dec. 15, 2020

(54) DOWNHOLE TENSION SENSING APPARATUS

(71) Applicant: Impact Selector International, LLC, Houma, LA (US)

(72) Inventor: Edward Harrigan, Richmond, TX (US)

(73) Assignee: Impact Selector International, LLC, Houma, LA (US)

(*) Notice: Subject to any disclaimer, the term of this patent is extended or adjusted under 35 U.S.C. 154(b) by 275 days.

(21) Appl. No.: 16/072,837

(22) PCT Filed: Jan. 25, 2017

(86) PCT No.: PCT/US2017/014988
§ 371 (c)(1),
(2) Date: Jul. 25, 2018

(87) PCT Pub. No.: WO2017/132287
PCT Pub. Date: Aug. 3, 2017

(65) Prior Publication Data
US 2019/0040733 A1 Feb. 7, 2019

Related U.S. Application Data

(60) Provisional application No. 62/286,838, filed on Jan. 25, 2016.

(51) Int. Cl.
*E21B 47/007* (2012.01)
*E21B 41/00* (2006.01)
(Continued)

(52) U.S. Cl.
CPC .......... *E21B 47/007* (2020.05); *E21B 17/003* (2013.01); *E21B 41/0085* (2013.01);
(Continued)

(58) Field of Classification Search
CPC .... E21B 47/007; E21B 47/12; E21B 41/0085; E21B 17/003; G01L 7/022; G01L 1/2218; H02J 1/10
See application file for complete search history.

(56) References Cited

U.S. PATENT DOCUMENTS 3,855,857 A    12/1974   Claycomb
2002/0148611 A1   10/2002  Williger et al.
(Continued)

FOREIGN PATENT DOCUMENTS

WO    WO-2010016897 A2 *  2/2010  ............ E21B 43/119
WO    2017132287 A1       8/2017

OTHER PUBLICATIONS

PCT/US2017/014988 International Search Report and Written Opinion dated May 23, 2017, 11 pages.

*Primary Examiner* — Eric S. McCall
*Assistant Examiner* — Timothy P Graves
(74) *Attorney, Agent, or Firm* — Boisbrun Hofman, PLLC

(57) ABSTRACT

Apparatus and method of sensing tension downhole, such as a tension sensing tool for coupling between opposing first and second portions of a tool string conveyable within a wellbore. The tension sensing tool may include a tension-bearing member, a load cell connected along the tension-bearing member and operable to generate information indicative of tension applied to the tension sensing tool, and electronic equipment communicatively connected with the load cell. The electronic equipment may be operable to record the information generated by the load cell and/or transmit the information generated by the load cell to a wellsite surface from which the wellbore extends.

24 Claims, 4 Drawing Sheets

(51) Int. Cl.
   *E21B 47/12*   (2012.01)
   *E21B 17/00*   (2006.01)
   *G01L 1/22*    (2006.01)
   *G01L 7/00*    (2006.01)
   *H02J 1/10*    (2006.01)

(52) U.S. Cl.
   CPC ............ *E21B 47/12* (2013.01); *G01L 1/2218* (2013.01); *G01L 7/00* (2013.01); *H02J 1/10* (2013.01)

(56) References Cited

U.S. PATENT DOCUMENTS

| | | |
|---|---|---|
| 2008/0216554 A1 | 9/2008 | McKee |
| 2009/0071645 A1 | 3/2009 | Kenison et al. |
| 2013/0043074 A1 | 1/2013 | Tassaroli |
| 2014/0251602 A1* | 9/2014 | Kenison ................ E21B 44/00 166/250.01 |
| 2015/0027736 A1 | 1/2015 | Smaardyk et al. |
| 2015/0059463 A1 | 3/2015 | Kenison et al. |
| 2015/0083408 A1 | 3/2015 | Coles |
| 2015/0167414 A1 | 6/2015 | Coles et al. |

\* cited by examiner

US 10,865,632 B2

DOWNHOLE TENSION SENSING APPARATUS

CROSS-REFERENCE TO RELATED APPLICATIONS

This application is a national stage of, and claims priority to and the benefit of, International Patent Application No. PCT/US2017/014988, titled "DOWNHOLE TENSION SENSING APPARATUS," filed Jan. 25, 2017, which claims priority to and the benefit of U.S. Provisional Application No. 62/286,838, titled "DOWNHOLE TENSION SENSING APPARATUS," filed Jan. 25, 2016, the entire disclosures of which are hereby incorporated herein by reference.

BACKGROUND OF THE DISCLOSURE

Drilling operations have become increasingly expensive as the need to drill deeper, in harsher environments, and through more difficult materials has become a reality. Consequently, in working with deeper and more complex wellbores, it becomes more likely that tools, tool strings, and/or other downhole equipment may experience problems during conveyance within such wellbores.

A downhole tool, often referred to as a perforating tool, may be utilized to perforate a casing, cement, and a subterranean formation surrounding the wellbore to prepare the well for production. The perforating tool may be included as part of the tool string and deployed downhole along with other downhole equipment. Tension may be applied by a tensioning device from a wellsite surface to the tool string via a conveyance means to convey the tool string within the wellbore. During or prior to performing the perforation operations, the tension applied to tool string may be monitored. However, in some downhole applications, such as in deviated wellbores or when multiple bends are present along the wellbore, friction between the conveyance means and a sidewall of the wellbore or the casing may prevent accurate determination of the tension applied to the tool string when measuring the tension at the wellsite surface.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
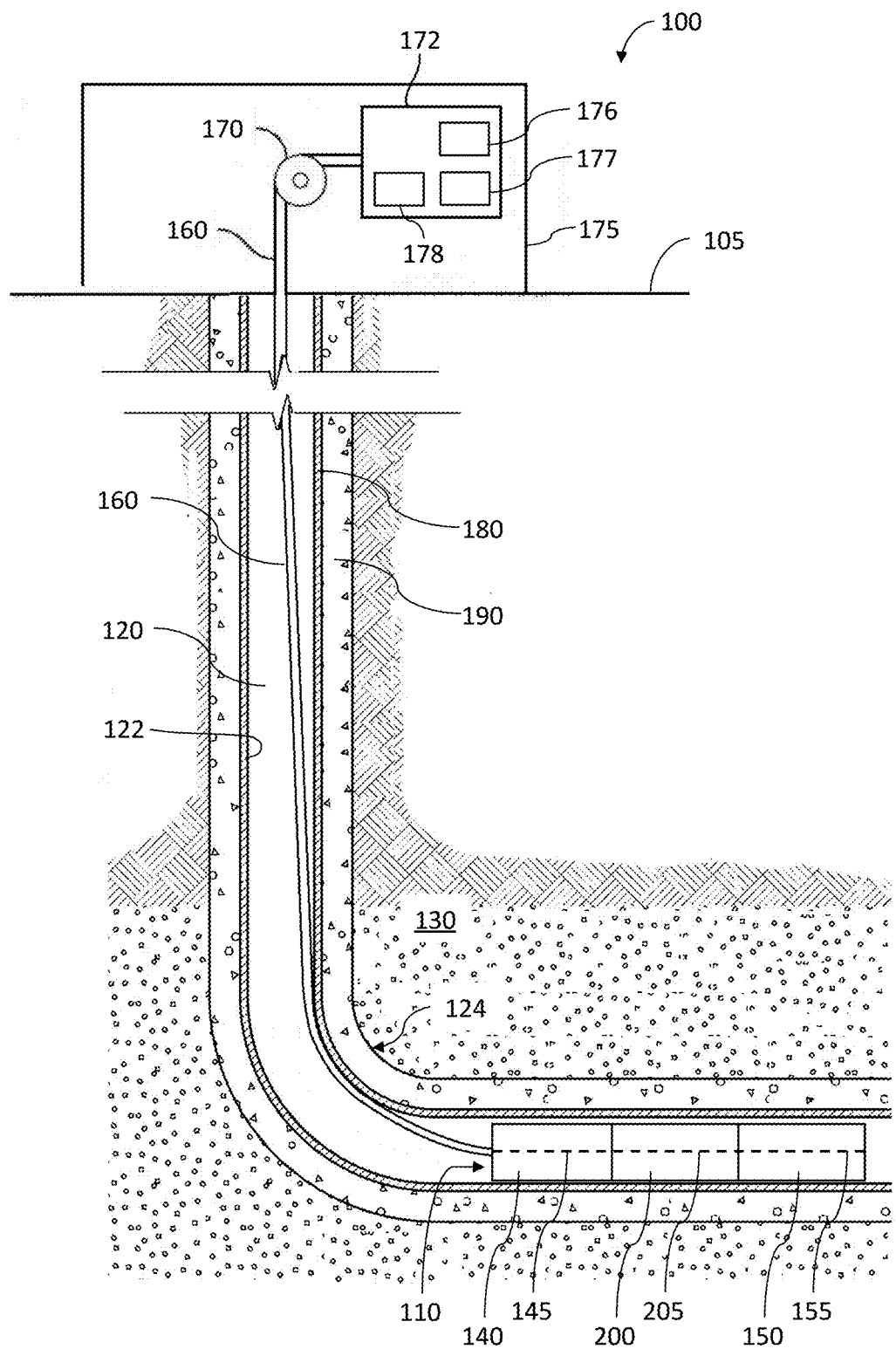
FIG. 1 is a schematic view of a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows, may include embodiments in which the first and second features are formed in direct contact, and may also include embodiments in which additional features may be formed interposing the first and second features, such that the first and second features may not be in direct contact.

FIG. 1 is a schematic view of at least a portion of a wellsite system 100 according to one or more aspects of the present disclosure. The wellsite system 100 may comprise a tool string 110 suspended within a wellbore 120 that extends from a wellsite surface 105 into one or more subterranean formations 130. The wellbore 120 is depicted as being a cased-hole implementation comprising a casing 180 secured by cement 190. However, one or more aspects of the present disclosure are also applicable to and/or readily adaptable for utilizing in open-hole implementations lacking the casing 180 and cement 190. The tool string 110 may be suspended within the wellbore 120 via a conveyance means 160 operably coupled with a tensioning device 170 and/or other surface equipment 175 disposed at the wellsite surface 105, including a power and control system 172.

The tensioning device 170 may apply an adjustable tensile force to the tool string 110 via the conveyance means 160 to convey the tool string 110 along the wellbore 120. The tensioning device 170 may be, comprise, or form at least a portion of a crane, a winch, a draw-works, a top drive, and/or another lifting device coupled to the tool string 110 by the conveyance means 160. The conveyance means 160 may be or comprise a wireline, a slickline, an e-line, coiled tubing, drill pipe, production tubing, and/or other conveyance means, and may comprise and/or be operable in conjunction with means for communication between the tool string 110, the tensioning device 170, and/or one or more other portions of the surface equipment 175, including the power and control system 172. The conveyance means 160 may also comprise a multi-conductor wireline and/or other electrical conductor(s) extending between the tool string 110 and the surface equipment 175. The power and control system 172 may include a source of electrical power 176, a memory device 177, and a controller 178 for receiving and process electrical signals from the tool string 110 and/or commands from a surface operator.

The tool string 110 is shown suspended in a non-vertical portion of the wellbore 120 resulting in the conveyance means 160 coming into contact with the casing 180 or a sidewall 122 of the wellbore 120 along a bend or deviation 124 in the wellbore 120. The contact may cause friction between the conveyance means 160 and the sidewall 122, such as may impede or reduce the tension being applied to the tool string 110 by the tensioning device 170. Although not shown, the conveyance means 160 may also be dragged along a bottom portion of the sidewall 122 of the non-vertical portion of the wellbore 120, resulting in additional friction between the conveyance means 160 and the sidewall 122.

The tool string 110 may comprise an upper portion 140, a lower portion 150, and a tension sensing sub or tool 200, coupled between the upper portion 140 and the lower portion 150. The upper and lower portions 140, 150 of the tool string 110 may each be or comprise one or more downhole tools, modules, and/or other apparatus operable in wireline, while-drilling, coiled tubing, completion, production, and/or other implementations. The upper portion 140 of the tool string 110 may comprise at least one electrical conductor 145 in electrical communication with at least one component of the surface equipment 175. The lower portion 150 of the tool string 110 may also comprise at least one electrical conductor 155 in electrical communication with at least one component of the surface equipment 175, wherein the at least one electrical conductor 145 and the at least one electrical conductor 155 may be in electrical communication via at least one electrical conductor 205 of the tension sensing tool 200. Thus, the electrical conductors 145, 155, 205 may connect with and/or form a portion of the conveyance means 160, and may include various electrical connectors and/or interfaces along such path, including as described below.

Each of the electrical conductors 145, 155, 205 may comprise a plurality of individual conductors, such as may facilitate electrical communication of the upper portion 140 of the tool string 110, the tension sensing tool 200, and the lower portion 150 of the tool string 110 with at least one component of the surface equipment 175, such as the power and control system 172. For example, the conveyance means 160 and the electrical conductors 145, 155, 205 may transmit and/or receive electrical power, data, and/or control signals between the power and control system 172 and one or more of the upper portion 140, the tension sensing tool 200, and the lower portion 150. The electrical conductors 145, 155, 205 may further facilitate electrical communication between two or more of the upper portion 140, the tension sensing tool 200, and the lower portion 150. Each of the upper portion 140, the lower portion 150, the tension sensing tool 200, and/or portions thereof may comprise one or more electrical connectors, such as may electrically connect the electrical conductors 145, 155, 205 extending therebetween.

The upper and lower portions 140, 150 of the tool string 110 may each be or comprise at least a portion of one or more downhole tools, modules, and/or other apparatus operable in wireline, while-drilling, coiled tubing, completion, production, and/or other operations. For example, the upper and lower portions 140, 150 may each be or comprise at least a portion of a cable head, a telemetry tool, a correlation tool, a directional tool, an acoustic tool, a density tool, an electromagnetic (EM) tool, a formation evaluation tool, a gravity tool, a formation logging tool, a magnetic resonance tool, a formation measurement tool, a monitoring tool, a neutron tool, a nuclear tool, a photoelectric factor tool, a porosity tool, a reservoir characterization tool, a resistivity tool, a seismic tool, a surveying tool, a release tool, a mechanical interface tool, a jarring or impact tool, a perforating tool, a cutting tool, a plug setting tool, and a plug.

Although FIG. 1 depicts the tool string 110 comprising a single tension sensing tool 200 directly coupled between two portions 140, 150, it is to be understood that the tool string 110 may include two, three, four, or more tension sensing tools 200 coupled together, or the tension sensing tools 200 may be separated from each other along the tool string 110 by the portions 140, 150. Furthermore, the tool string 110 may comprise a different number of portions 140, 150, wherein each portion 140, 150 may be directly and/or indirectly coupled with the tension sensing tool 200. It is also to be understood that the tension sensing tool 200 may be coupled elsewhere along the tool string 110, whether in an uphole or downhole direction with respect to the upper and lower portions 140, 150 of the tool string 110.

Figure 2:
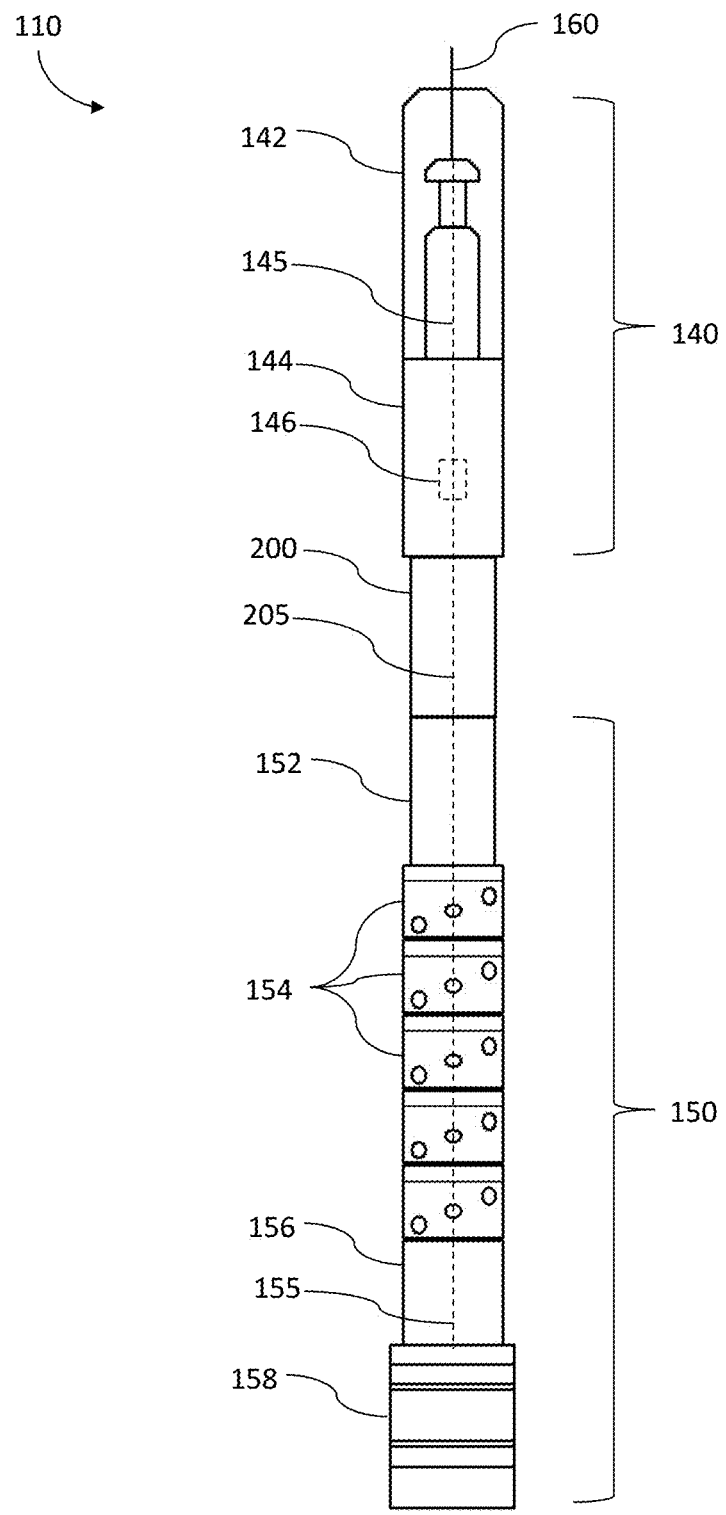
FIG. 2 is a side view of a portion of an example implementation of the apparatus shown in FIG. 1 according to one or more aspects of the present disclosure.

FIG. 2 is a side view of at least a portion of an example implementation of the tool string 110 shown in FIG. 1 according to one or more aspects of the present disclosure. The following description refers to FIGS. 1 and 2, collectively. The upper portion 140 of the tool string 110 may comprise a cable head 142, which may be operable to connect the conveyance means 160 with the tool string 110. The upper portion 140 may further comprise a control tool 144, which may comprise a controller 146, such as may be operable to store and/or receive control commands from the power and control system 172 via the electrical conductor 145 for controlling one or more portions and/or components of the tool string 110. For example, the control tool 144 may be further operable to store and/or communicate to the power and control system 172 information generated by one or more sensors or instruments of the tool string 110. The control tool 144 may comprise inclination sensors and/or other position sensors, such as one or more accelerometers, magnetometers, gyroscopic sensors (e.g., micro-electro-mechanical system (MEMS) gyros), and/or other sensors for utilization in determining the orientation of the tool string 110 relative to the wellbore 120. The control tool 144 may further comprise a correlation tool, such as a casing collar locator (CCL) for detecting ends of casing collars by sensing a magnetic irregularity caused by the relatively high mass of an end of a collar of the casing 180. The correlation tool may also or instead be or comprise a gamma ray (GR) tool that may be utilized for depth correlation. The CCL and/or GR tools may transmit signals in real-time to the wellsite surface equipment 175, such as the power and control system 172, via the conveyance means 160. The CCL and/or GR signals may be utilized to determine the position of the tool string 110 or portions thereof, such as with respect to known casing collar numbers and/or positions within the wellbore 120. Therefore, the CCL and/or GR tools may be utilized to detect and/or log the location of the tool string 110 within the wellbore 120, such as during deployment within the wellbore 120 or other downhole operations.

The lower portion 150 of the tool string 110 may comprise one or more perforating guns or tools 154, such as may be operable to perforate or form holes though the casing 180, the cement 190, and the portion of the formation 130 surrounding the wellbore 120 to prepare the well for production. The perforating tools 154 may contain one or more shaped explosive charges operable to perforate the casing 180, the cement 190, and the formation 130 upon detonation. The lower portion 150 of the tool string 110 may also comprise a plug 158 and a plug setting tool 156 for setting the plug 158 at a predetermined position within the wellbore 120 to isolate a lower portion of the wellbore 120. The plug 158 may be permanent or retrievable, permitting the lower portion of the wellbore 120 to be permanently sealed or temporarily isolated, such as during treatment operations conducted on an upper portion of the wellbore 120. The lower portion 150 of the tool string 110 may further comprise a release joint or tool 152 operable to selectively part or disconnect under controlled conditions. The release tool 152 may permit a portion of the tool string 110 connected below the release tool 152 to be left in the wellbore 120 while a portion of the tool string 110 located above the release tool 152 may be retrieved to the wellsite surface 105.

Coupled between the upper and lower portions 140, 150 of the tool string 110 is the tension sensing tool 200 operable to transmit tension from the upper portion 140 to the lower portion 150 while monitoring or detecting downhole the tension applied to the tool string 110 at the wellsite surface 105 via the conveyance means 160. As stated above, tension transmitted from the tensioning device 170 via the conveyance means 160 may be affected by friction along the wellbore 120, especially in deviated and horizontal wellbores 120. Accordingly, measuring tension at the wellsite surface 105 may be an unpredictable and often inaccurate indicator of the actual tension applied to the tool string head 142. Accordingly, the tension sensing tool 200 is operable to measure the tension applied to or otherwise experienced by the tension sensing tool 200 and, thus, the tool string 110.

Figure 3:
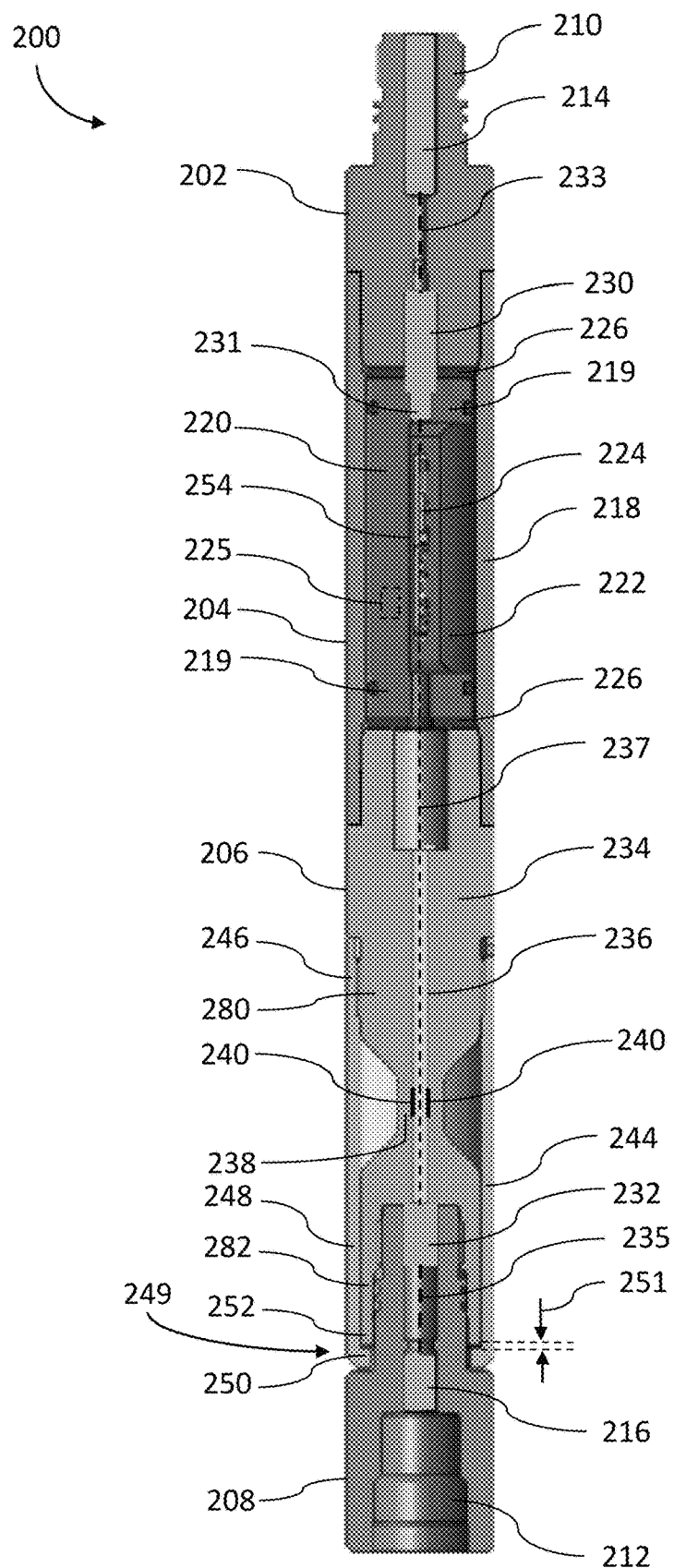
FIG. 3 is a sectional view of a portion of an example implementation of the apparatus shown in FIG. 2 according to one or more aspects of the present disclosure.

FIG. 3 is a sectional view of at least a portion of an example implementation of the tension sensing tool 200 shown in FIG. 2 according to one or more aspects of the present disclosure. The following description refers to FIGS. 1-3, collectively.

The tension sensing tool 200 comprises an upper head 202, an electronics section or module 204, a load cell section or module 206, and lower head 208, each having or defining one or more internal spaces, volumes, and/or bores accommodating or otherwise containing various components of the tension sensing tool 200, including the electrical conduit 205. Although the tension sensing tool 200 is shown as comprising a plurality of portions coupled together, it is to be understood that the tension sensing tool 200 may be or comprise a single unitary member.

The upper head 202 of the tension sensing tool 200 may include a mechanical interface, a sub, and/or other means 210 for mechanically coupling the tension sensing tool 200 with a corresponding mechanical interface (not shown) of the upper portion 140 of the tool string 110. The interface means 210 may be integrally formed with or coupled to the upper head 202, such as via a threaded connection. The lower head 208 of the tension sensing tool 200 may include a mechanical interface, a sub, and/or other means 212 for mechanically coupling with a corresponding mechanical interface (not shown) of the lower portion 150 of the tool string 110. The interface means 212 may be integrally formed with or coupled to the lower head 208, such as via a threaded connection. The interface means 210, 212 may comprise threaded connectors, fasteners, box-pin couplings, and/or other mechanical coupling means.

The upper interface means 210 and/or another portion of the upper head 202 may further include an electrical interface 214 comprising means for electrically connecting an electrical conductor 233 extending through the upper head 202 with a corresponding electrical interface (not shown) of the upper portion 140 of the tool string 110, whereby the corresponding electrical interface of the upper portion 140 may be in electrical connection with the electrical conductor 145. The lower interface means 212 and/or another portion of the lower head 208 may include an electrical interface 216 comprising means for electrically connecting an electrical conductor 235 extending through the lower head 208 with a corresponding interface (not shown) of the lower portion 150 of the tool string 110, whereby the corresponding electrical interface of the lower portion 150 may be in electrical connection with the electrical conductor 155. The electrical interfaces 214, 216 may each comprise electrical connectors, plugs, pins, receptacles, terminals, conduit boxes, and/or other electrical coupling means.

The upper head 202 may be mechanically and electrically coupled with the electronics module 204. For example, a lower portion of the upper head 202 may be threadedly or otherwise coupled with an upper portion of a housing 218 of the electronics module 204 to mechanically couple the electronics module 204 with the upper head 202. The housing 218 may define an internal space or volume 222, which may be operable to accommodate therein an electronics carrier or chassis 220 operable to carry or otherwise retain an electronics board 224. The chassis 220 may comprise one or more substantially planar mounting plates or surfaces 254 extending longitudinally within the internal volume 222 for accommodating the electronics board 224. The electronics board 224 may be connected on the mounting surface 254 with one or more fasteners (not shown). The chassis 220 may comprise end portions 219 for permitting insertion of the chassis 220 into the internal volume 222, while minimizing radial movement within the internal volume 222 or otherwise maintaining the chassis 220 in a predetermined radial position with respect to the housing 218. The chassis 220 may have a sufficient thickness and/or strength so as to aid in preventing or minimizing flexing of the electronics board 224 during perforation and other operations, which may aid in preventing or minimizing physical damage to the electronics board 224. Damping members 226 may be disposed on opposing sides of the chassis 220, such as may aid in damping and/or otherwise reducing shock transmitted to the electronics board 224 during deployment, perforation operations, and/or other downhole operations. The damping members 226 may comprise rubber, polyether ether ketone (PEEK), silicone, VITON, potting material, and/or other damping material.

The electronics board 224 may comprise various electronic components facilitating generation, reception, processing, recording, and/or transmission of electronic data, as well as distribution of electrical power to the electronic components. For example, the electronics board 224 may include a processing device 318 (shown in FIG. 4), a memory device 344 (shown in FIG. 4), and a communication device 338 (shown in FIG. 4). The electronics board 224 may be in signal communication with a plurality of sensors, such as a temperature sensor 225 and a load cell strain gauge 240 via leads (not shown) or other means. Output signals or data generated by the sensors 225, 240 may be communicated to the processing device 318 for processing, storage to the memory device 344, and/or transmission to the wellsite surface 105 with the communication device 338.

The temperature sensor 225, such as a resistance temperature detector (RTD), may be mounted to or within the chassis 220 or another location within the tension sensing tool 200. The temperature sensor 225 may monitor the temperature within the electronics module 204 or within another portion of the tension sensing tool 200. The temperature sensor 225 may also monitor wellbore or ambient temperature external to the tool string 110.

The electronics board 224 may be electrically connected with or along one or more conductors extending between the upper and lower heads 202, 208, such as to permit communication of the electronic data and/or electrical power between the electronics board 224, the upper and lower portions 140, 150 of the tool string 110, and/or the surface equipment 175. Accordingly, each of the upper and lower heads 202, 208 may further comprise additional electrical interfaces 230, 232 facilitating electrical connection between the upper and lower heads 202, 208 and the electronics board 224. For example, the upper head 202 may comprise a lower electrical interface 230 having means for electrically connecting the electrical conductor 233 extending through the upper head 202 with a corresponding electrical interface 231 of the electronics module 204 electrically connected with the electronics board 224. Similarly, the lower head 208 may comprise an upper electrical interface 232 having means for electrically connecting the electrical conductor 235 extending through the lower head 208 with an electrical conductor 237 extending through the load cell module 206 to the electronics board 224. The electrical interfaces 230, 231, 232 may each comprise a pin connector, a receptacle, a plug, a terminal, a conduit box, and/or another electrical connector. Although shown as a plurality of distinct components, the electrical conductors 233, 235, 237 along with the electrical interfaces 214, 216, 230, 231, 232 may collectively be or comprise at least a portion of the electrical conductor 205 described above and shown in FIGS. 1 and 2.

The electronics module 204 may be mechanically and electrically coupled with the load cell module 206. For example, a lower portion of the housing 218 of the electronics module 204 may be threadedly or otherwise coupled with an upper portion of a tension-bearing portion 234 (hereinafter referred to as a "body") of the load cell module 206 to couple the load cell module 206 with the electronics module 204. The body 234 may comprise a narrowed portion 238 and an axial bore 236 extending longitudinally through the body 234. The axial bore 236 may accommodate the electrical conductor 237 and one or more strain gauges 240 along an inner surface of the axial bore 236 adjacent the narrowed portion 238. The strain gauges 240 may be operable to generate signals indicative of the axial loads (i.e., tension and compression) applied to the narrowed portion 238 and, thus, tension sensing tool 200 and/or the tool string 110. The axial bore 236 may further accommodate electrical leads or other conductors (not shown) extending between the strain gauges 240 and the electronics board 224 for transmitting the signals indicative of the axial loads to the electronics board 224.

Figure 4:
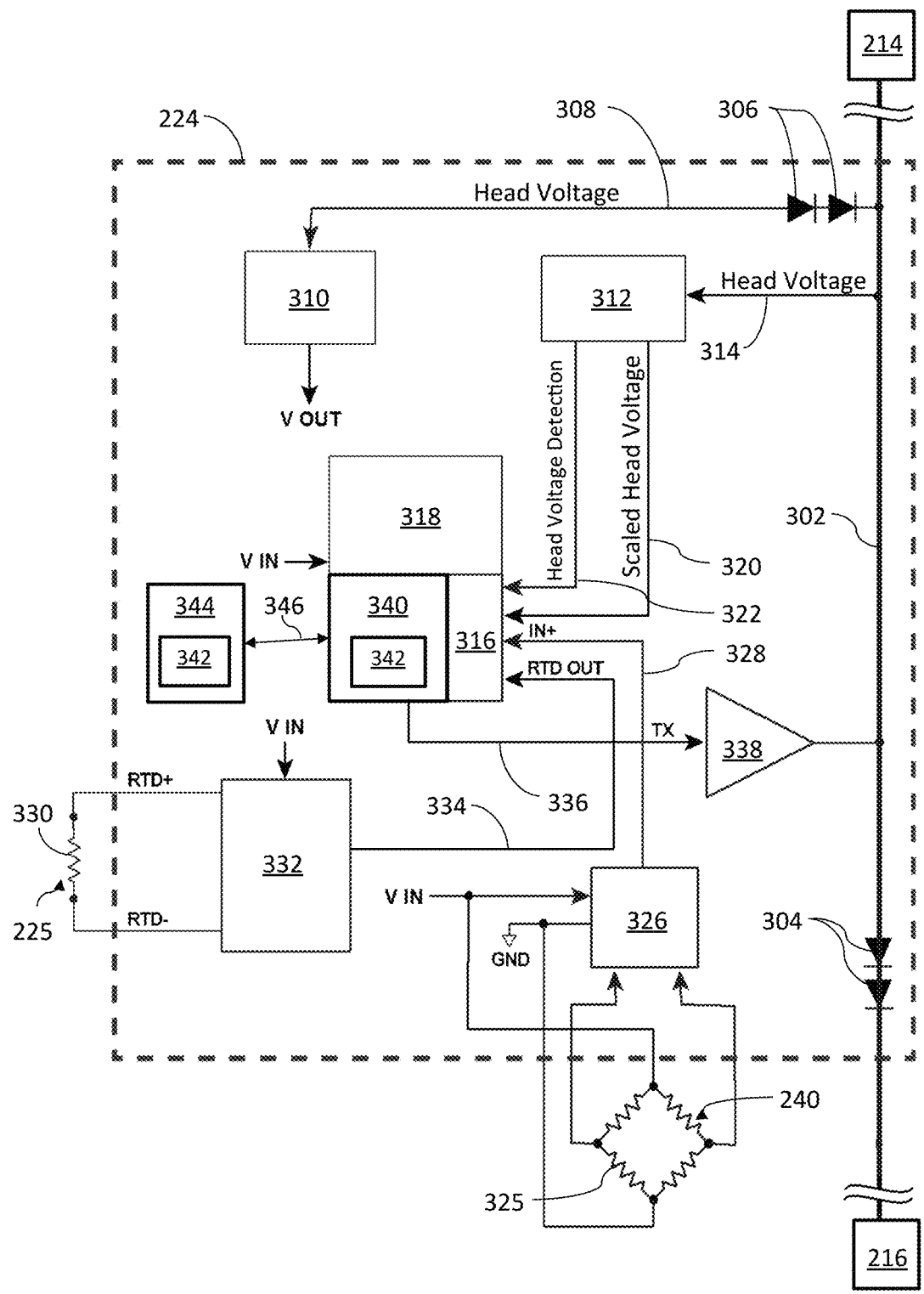
FIG. 4 is a schematic view of a portion of an example implementation of the apparatus shown in FIG. 3 according to one or more aspects of the present disclosure.

A lower portion of the body 234 of the load cell module 206 may be threadedly or otherwise coupled with the lower head 208 to couple the load cell module 206 with the lower head 208. As the tool string 110 is conveyed along the wellbore 120, the housing 218 of the electronics module 204 transmits tension applied to the upper head 202 to the body 234 of the load cell module 206, while the lower head 208 transmits weight of the lower portion 150 of the tool string 110, including the perforating tools 154 and the plug 158, to the body 234. As shown in FIG. 4, the narrowed portion 238 of the body 234 is substantially narrower than other portions of the body 234, resulting in substantially greater stress concentrations and, thus, strain, at the narrowed portion 238. Accordingly, the tension applied to the upper head 202 and the weight applied to the lower head 208 may cause the body 234 to strain at the narrowed portion 238. Because a cross-sectional area of the narrowed portion 238 is known, the strain measured by the strain gauges 240 may be utilized to determine the axial loads applied to or experienced by the narrowed portion 238 and, thus, the tension sensing tool 200.

The load cell module 206 may further include an outer sleeve 244 disposed about at least a portion of the body 234, including the narrowed portion 238. For example, an upper portion 246 of the outer sleeve 244 may be threadedly or otherwise coupled with a portion 280 of the body 234 above the narrowed portion 238, while a lower portion 248 of the outer sleeve 244 may be slidably disposed about a portion 282 of the body 234 below the narrowed portion 238. Another portion 249 of the sleeve 244 may comprise an inwardly extending shoulder or another engaging feature 250 separated from an outwardly extending shoulder, a downward facing shoulder or another engaging feature 252 of the body 234 (e.g., of the body portion 282) by an axially extending gap or space 251. Accordingly, the sleeve 244 may limit bending of the body 234 at the narrowed portion 238 and, thus, prevent or reduce false tension readings and/or protect the narrowed portion 238 from excessive lateral or bending loads. However, the sleeve 244 may not support axial loads, unless sufficiently high axial loads are applied to the tension sensing tool 200 to cause the narrowed portion 238 to stretch such that the engaging feature 250 of the sleeve 244 contacts or engages the engaging feature 252 of the body 234. Axial loads that may cause the engaging features 250, 252 to contact may be encountered, for example, during jarring and/or fishing operations. The outer sleeve 244 may also protect the body 234 against bending when the tension sensing tool 200 is picked up from horizontal to vertical, set down, or otherwise handled at the wellsite surface 105.

The tension sensing tool 200 described herein and shown in FIG. 3 is oriented such that the load cell module 206 is located below the electronics module 204. However, it is to be understood that the orientation of the tension sensing tool 200 within the tool string 110 may be reversed 180 degrees, such that the load cell module 206 is located above the electronics module 204, without affecting the operation of the tension sensing tool 200.

Table 1 set forth below lists example specifications and/or operating parameters of the tension sensing tool 200.

TABLE 1

| Tension Sensing Tool Specifications | |
|---|---|
| Maximum Operating Pressure | 20,000 PSI |
| Maximum Operating Temperature | 175° C. |
| Minimum Operating Temperature | −25° C. |
| Minimum Storage Temperature | −55° C. |
| Axial Shock | 2,000 g, 2 ms |
| Transverse Shock | 250 g, 2 ms |
| Explosive Safety | API RP-67 Compliant |
| Operating Voltage Polarity | Negative |
| Operating Voltage | −20 V to −50 V |
| Operating Current | <30 mA |
| Tool Weight | 35 lb. |
| Tool Make-Up Length | 27¼" |
| Tool Diameter | 2¾" |
| Upper Connection | 1⅝"-6 ACME Pin |
| Lower Connection | 1⅝"-6 ACME Box |
| Fishing Strength | 100,000 lbf |
| Tension Range | 0-10,000 lbf |
| Resolution | 2.5 lbf |
| Sampling Rate | 10 Hz |

However, Table 1 merely provides example values, and many other values are also within the scope of the present disclosure.

FIG. 4 is a schematic view of at least a portion of an example implementation of the electronics board 224 shown in FIG. 3 according to one or more aspects of the present disclosure. The following description refers to FIGS. 2, 3, and 4, collectively.

The electronics board 224 may comprise a bus or electrical conductor 302 connected along or forming at least a portion of the electrical conductor 205 described above and shown in FIGS. 1 and 2. One side of the electrical conductor 302 may be electrically connected with the electrical interface 214 of the upper head 202 via the electrical conductor 233 and the electrical interfaces 230, 231, while an opposing side of the electrical conductor 302 may be electrically connected with the electrical interface 216 of the lower head 208 via the electrical conductors 235, 237 and the electrical interface 232. One or more diodes 304 may be connected in series with or along the electrical conductor 302. The diodes 304 may be oriented to pass positive voltage from the upper electrical interface 214 to the lower electrical interface 216 and, thus, to the one or more tools of the lower portion 150 of the tool string 110 connected below the tension sensing tool 200, including the perforating tools 154 and the plug setting tool 156. The one or more diodes 304 may block negative voltage at the upper electrical interface 214 from reaching the lower electrical interface 216.

As described above, the electronics board 224 may comprise various electronic components, which may be electrically connected in parallel with the electrical conductor 302 via one or more electrical conductors. For example, the electronics board 224 may comprise an input electrical conductor 308 for conducting electrical power from the electrical conductor 302 to one or more of the electronic components. One or more diodes 306 may be connected in series or along the input electrical conductor 308 to pass negative voltage from the electrical conductor 302 to the electronic components and to block positive voltage at the upper electrical interface 214 from reaching the electronic components.

The electronic components of the electronics board 224 may be powered with a voltage ranging between about −20 Volts and about −50 Volts, or another negative polarity voltage. The nominal head voltage on the electrical conductor 302 may be about −20 Volts+/−2 Volts, with a mass (e.g., the housing 218, the upper head 202) of the tension sensing tool 200 acting as a power line or a return line. If one or more portions of the electrical conductors 145, 155, 205 comprise an armor and/or multiple electrical conductors (both of which are not shown), the return line may also or instead be along the armor and/or one or more of the multiple electrical conductors.

The nominal head voltage from the electrical conductor 302 may be applied to one or more power supplies 310 via the input electrical conductor 308 to supply the nominal voltage to power the various electronic components, including a micro controller or another processing device 318, a load cell instrument amplifier and filter 326, and an RTD driver amplifier and filter 332. The one or more diodes 306 permit passage of the nominal voltage to the one or more power supplies 310.

The voltage from the electrical conductor 302 is also passed to a head voltage scaler and detector 312 via an electrical conductor 314, such as to provide a scaled head voltage and a head voltage detection signal to an analog-to-digital converter (ADC) 316 portion of the processing device 318 via electrical conductors 320, 322, respectively. The head voltage scaler and detector 312 may facilitate detection of electrical polarity of electrical conduit 302, such as to detect whether the tool string 110 is in a detonation mode or another mode of operation.

The electronics board 224 may further include the load cell instrument amplifier and filter 326 electrically connected to the strain gauge 240, which may be implemented as a Wheatstone bridge strain gage 325. A first branch of the strain gage 325 may be connected between input voltage (V IN) and ground (GND), to provide the bridge excitation voltage. The GND may include electrical connection with the mass of the tension sensing tool 200. A second branch of the strain gage 325 may provide an imbalance voltage differentially to the load cell instrument amplifier and filter 326. The load cell instrument amplifier and filter 326 outputs a load signal voltage (IN+) indicative of tension to the ADC 316 via an electrical conductor 328.

The temperature sensor 225 may be electrically connected to the electronics board 224 to generate a signal indicative of temperature at a predetermined location within the tension sensing tool 200. The temperature sensor 225 may be implemented as an RTD 330 and electrically connected to an RTD driver amplifier and filter 332 to provide a current source to the RTD 330. The RTD 330 changes resistance with temperature and because the current through the RTD 330 is held constant, an RTD+ voltage varies directly with the temperature at the RTD 330 to permit temperature monitoring. The RTD+ signal voltage is applied to the RTD driver amplifier and filter circuit 332, which provides the RTD output signal voltage (RTD OUT) to the micro controller ADC 316 via an electrical conductor 334. The RTD 330 may be a one kilo-ohm RTD and, as described above, the RTD 330 may be disposed at or within the chassis 220.

The processing device 318 receives and processes the IN+ and RTD OUT signals and outputs a transmitter (TX) signal indicative of the tension and temperature to the communication device 338 via an electrical conductor 336. The communication device 338 may be or comprise a telemetry driver operable for communication with the power and control system 172 or another portion of the surface equipment 175. The telemetry driver may be operable, for example, to vary or modulate the current through the electrical conductor 302 to transmit the TX signal via the electrical conductors 302, 205, 145 and the conveyance means 160 to the wellsite surface 105 in the form of current frequency variations. The frequency range of the telemetry driver may be selected to occupy a different frequency band from the correlation tool or other control tools 144 of the tool string 110. The modulated TX signal may be monitored at the wellsite surface 105 and displayed and/or recorded by the memory device 177 or another portion of the power and control system 172.

The modulated TX signal may be communicated to a tensioning device controller (not shown) or otherwise utilized at the wellsite surface 105 to control the tensioning device 170, such as to facilitate dynamic or real-time control of the tensioning device 170 in response to variations in tension at the tool string 110. The modulated TX signal may also be converted to an audio signal via an acoustic speaker, such as to provide a tensioning device operator with audio feedback as the tool string 110 is being conveyed within the wellbore 120.

Drifts in the TX signal and/or the modulated TX signal caused by ambient temperature changes as the tool string 110 is conveyed within the wellbore 120 may be temperature compensated with the temperature sensor 225. However, if the wellbore temperature versus depth profile is known, temperature compensation may be performed digitally by the power and control system 172 at the wellsite surface 105.

Referring still to FIG. 4, the processing device 318 may comprise a local memory 340, and may execute coded instructions 342 present in the local memory 340 and/or another memory device. The processing device 318 may execute, among other things, machine-readable instructions or programs to implement example methods and/or processes described herein. The programs stored in the local memory 340 may include program instructions or computer program code that, when executed by the processing device 318, cause the tension sensing tool 200 to perform the example methods and/or processes described herein. The processing device 318 may be, comprise, or be implemented by one or a plurality of processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processing device 318 may be in communication with a memory device 344, such as may include a volatile memory and a non-volatile memory, via an electrical conductor 346. The volatile memory may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory may be, comprise, or be implemented by read-only memory, flash memory, and/or other types of memory devices. One or more memory controllers (not shown) may control access to the volatile memory and/or non-volatile memory. The memory device 344 may be operable to store or record the coded instructions 342, information entered by the human operators, and/or information processed and/or generated by the processing device 318.

The coded instructions 342 may include program instructions or computer program code that, when executed by the processing device 318, may cause the processing device 318 and/or another portion of the tension sensing tool 200 or the wellsite system 100 to perform methods and processes described herein. For example, V IN may be applied to the processing device 318 to boot up the processing device 318 and start a processing sequence that may include one or more of:

1) Selecting an analog signal channel for conversion, which includes the head voltage detection signal, the scaled head voltage signal, the IN+ signal, and/or the RTD OUT signal communicated to the ADC.

2) Converting the analog sensor signals IN+ and RTD OUT to a digital signal with the ADC.

3) Compiling telemetry data, which includes the IN+ signal indicative of the tension and the RTD OUT signal indicative of the temperature.

4) Applying the TX signal comprising the telemetry data to the communication device 338 for transmission via the electrical conductor 302.

5) Saving the telemetry data to the memory device 344.

In view of the entirety of the present disclosure, including the figures and the claims, a person having ordinary skill in the art should readily recognize that the present disclosure introduces an apparatus comprising: (1) a tension sensing tool for coupling between opposing first and second portions of a downhole tool string, wherein the tension sensing tool comprises one or more of: (a) a load cell connected along a tension-bearing member of the tension sensing tool and operable to generate information indicative of tension applied to the tension sensing tool; and (b) a processing device operable to receive the information indicative of the tension and output the information indicative of the tension to a wellsite surface; and (2) a perforating tool for coupling within the tool string and operable to perforate at least a portion of a subterranean formation surrounding a wellbore.

The tension sensing tool may further comprise: a first coupling head at a first end of the tension sensing tool and operable for mechanically and electrically connecting the first end of the tension sensing tool to the first portion of the tool string; and a second coupling head at a second end of the tension sensing tool and operable for mechanically and electrically connecting the second end of the tension sensing tool to the second portion of the tool string.

The tension sensing tool may further comprise: an electronics module comprising the processing device; and a load cell module comprising the tension-bearing member and the load cell. The electronics module may further comprise: a housing; a chassis disposed within the housing; and an electronics board connected to the chassis, wherein the electronics board may be or comprise the processing device. The tension-bearing member may be operable to bear the tension applied to the tension sensing tool, the tension-bearing member may comprise a narrowed portion operable to stretch when the tension is applied to the tension sensing tool, and the load cell may be connected to a surface of the narrowed portion. The tension sensing tool may further comprise a sleeve disposed at least partially about the tension-bearing member, the sleeve may be fixedly connected to a first portion of the tension-bearing member on one side of the narrowed portion, and the sleeve may be slidably disposed about a second portion of the tension-bearing member on an opposing side of the narrowed portion.

The processing device may operate on a negative voltage polarity.

The tension sensing tool may further comprise an electronics board comprising the processing device, and the electronics board may be electrically powered by negative voltage. The electronics board may be electrically connected to an electrical power source with a diode connected in series between the electronics board and the electrical power source to pass negative voltage from the electrical power source to the electronics board and to block positive voltage from the electrical power source from reaching the electronics board.

The apparatus may further comprise a temperature sensor operable to generate information indicative of temperature within at least a portion of the tension sensing tool.

The present disclosure also introduces a method comprising: (1) applying tension to a tool string to convey the tool string within a wellbore, wherein the tool string comprises: (a) a tension sensing tool coupled between first and second portions of the tool string, and wherein the tension sensing tool comprises: (i) a load cell connected along a tension-bearing member of the tension sensing tool; and (ii) a processing device; and (b) a perforating tool operable to perforate at least a portion of a subterranean formation surrounding a wellbore; and (2) operating the tension sensing tool to cause: (a) the load cell to generate information indicative of the tension applied to the tool string; and (b) the processing device to receive, process, and output the information indicative of the tension applied to the tool string.

The method may further comprise operating the perforating tool to perforate at least the portion of the subterranean formation surrounding the wellbore.

The method may further comprise operating the tension sensing tool to cause the processing device to receive, process, and output the information indicative of the tension applied to the tool string to a memory device in the tool string and/or to a memory device at a wellsite surface.

The tension sensing tool may further comprise an analog-to-digital converter (ADC) and a telemetry driver, and operating the tension sensing tool may further comprise operating the tension sensing tool to cause the processing device to: convert the information indicative of the tension generated by the load cell from an analog form to a digital form with the ADC; compile telemetry information indicative of the tension applied to the tool string; and communicate the telemetry information from the processing device to the telemetry driver for transmission to a wellsite surface.

The tension sensing tool may further comprise a temperature sensor, and operating the tension sensing tool may further comprise operating the tension sensing tool to cause: the temperature sensor to generate information indicative of temperature within at least a portion of the tension sensing tool; and the processing device to receive, process, and output the information indicative of the temperature.

Operating the tension sensing tool may further comprise operating the tension sensing tool on a negative voltage polarity.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

The invention claimed is:

1. An apparatus comprising:
   a tension sensing tool for coupling between opposing first and second portions of a tool string conveyable within a wellbore extending into a subterranean formation, wherein the tool string comprises a perforating tool operable to perforate the formation, and wherein the tension sensing tool comprises:
   a tension-bearing member;
   a load cell connected along the tension-bearing member and operable to generate information indicative of tension applied to the tension sensing tool;
   electronic equipment communicatively connected with the load cell and operable to at least one of:
   record the information generated by the load cell; and
   transmit the information generated by the load cell to a wellsite surface from which the wellbore extends;
   a first electrical conductor extending through the tension sensing tool between the first and second portions of the tool string;
   a second electrical conductor electrically connected with the first electrical conductor; and
   a power supplying device electrically connected with the second electrical conductor and operable to supply negative polarity electrical power to the load cell and the electronic equipment.

2. The apparatus of claim 1 wherein the tension sensing tool further comprises a diode connected along the second electrical conductor and configured to permit passage of the negative polarity electrical power from the first electrical conductor to the power supplying device.

3. The apparatus of claim 2 wherein:
   the second portion of the tool string is located downhole from the tension sensing tool and comprises the perforating tool;
   the diode is a first diode;
   the tension sensing tool further comprises a second diode connected along the first electrical conductor; and
   the second diode is configured to permit passage of a positive polarity electrical power from the wellsite surface to the perforating tool.

4. The apparatus of claim 1 wherein:
   the tension sensing tool further comprises a temperature sensor powered by the negative polarity electrical power;
   the temperature sensor is electrically connected with the power supplying device and communicatively connected with the electronic equipment;
   the temperature sensor is operable to generate information indicative of wellbore temperature; and
   the information indicative of wellbore temperature is received by the electronic equipment and utilized to compensate the information indicative of the applied tension for drift caused by changing wellbore temperature.

5. The apparatus of claim 1 wherein:
   the tension-bearing member comprises a first portion, a second portion, and a third portion between and narrower than the first and second portions and operable to stretch when the tension is applied to the tension sensing tool;
   a bore extends axially through the tension-bearing member; and
   the load cell is connected to an inner wall of the bore along the third portion.

6. The apparatus of claim 5 wherein the tension sensing tool further comprises a sleeve disposed at least partially about the tension-bearing member, wherein the sleeve is fixedly connected with the first portion and slidably engages the second portion.

7. The apparatus of claim 6 wherein the sleeve is fixedly connected with the first portion along a first axial distance, and wherein the sleeve slidably engages the second portion along a second axial distance that is greater than the first axial distance.

8. The apparatus of claim 6 wherein:
   a first portion of the sleeve is fixedly connected with the first portion of the tension-bearing member;
   a second portion of the sleeve comprises an inwardly extending shoulder;
   an intermediate portion of the sleeve located between the first and second portions of the sleeve slidably engages the second portion of the tension-bearing member;
   the second portion of the tension-bearing member comprises a downward facing shoulder; and
   the inwardly extending shoulder and the downward facing shoulder are configured to contact when a threshold tension is applied to the tension-bearing member thereby preventing the third portion of the tension-bearing member from further stretching.

9. The apparatus of claim 6 wherein the sleeve limits bending of the tension-bearing member at the third portion.

10. The apparatus of claim 6 wherein the tension sensing tool does not comprise a fluid seal between and sealingly engaging the sleeve and the second portion.

11. A method comprising:
   conveying a tool string within a wellbore that extends into a subterranean formation, wherein the tool string comprises:
   a perforating tool operable to perforate the subterranean formation; and
   a tension sensing tool comprising:
   a tension-bearing member;

a load cell connected along the tension-bearing member;
a processing device;
a first electrical conductor extending through the tension sensing tool between opposing portions of the tool string, wherein the tension sensing tool is located between the opposing portions of the tool string;
a second electrical conductor electrically connected with the first electrical conductor;
a power supplying device electrically connected with the second electrical conductor, the load cell, and the processing device; and
a diode connected along the second electrical conductor and permitting passage of negative polarity electrical power to the power supplying device;
supplying the negative polarity electrical power to the load cell and the processing device from a wellsite surface from which the wellbore extends, including:
supplying the negative polarity electrical power from the wellsite surface to the first electrical conductor;
passing the negative polarity electrical power from the first electrical conductor to the power supplying device via the second electrical conductor and the diode; and
supplying the negative polarity electrical power from the power supplying device to the load cell and the processing device;
operating the load cell to generate information indicative of tension applied to the tool string;
operating the processing device to receive and process the information; and
transmitting the processed information to the wellsite surface.

12. The method of claim 11 wherein:
the diode is a first diode;
the tension sensing tool further comprises a second diode connected along the first electrical conductor; and
the method further comprises supplying positive polarity electrical power from the wellsite surface to the perforating tool located downhole from the tension sensing tool via the first electrical conductor.

13. The method of claim 11 wherein the tension sensing tool further comprises a temperature sensor, and wherein the method further comprises:
supplying the negative polarity electrical power to the temperature sensor;
operating the temperature sensor to generate information indicative of wellbore temperature; and
operating the processing device to:
receive and process the information indicative of wellbore temperature; and
compensate the information indicative of the applied tension for drift caused by changing wellbore temperature.

14. The method of claim 11 wherein:
the tension-bearing member comprises:
a first portion;
a second portion comprising a downward facing shoulder;
a third portion between and narrower than the first and second portions, wherein a bore extends axially through the tension-bearing member, and wherein the load cell is connected to an inner wall of the bore along the third portion; and
a sleeve disposed at least partially about the tension-bearing member, wherein:
a first portion of the sleeve is fixedly connected with the first portion of the tension-bearing member;
a second portion of the sleeve slidably engages the second portion of the tension-bearing member;
a third portion of the sleeve comprises an inwardly extending shoulder, and
the second portion of the sleeve is located between the first and third portions of the sleeve; and
the method further comprises applying tension to the tool string thereby causing:
the third portion of the tension-bearing member to stretch; and
the inwardly extending shoulder and the downward facing shoulder to contact thereby preventing the narrower portion from further stretching.

15. The method of claim 11 wherein:
the tension-bearing member comprises:
a first portion;
a second portion;
a third portion between and narrower than the first and second thicker portions, wherein the load cell is connected along the third portion; and
a sleeve disposed at least partially about the tension-bearing member, wherein:
a first portion of the sleeve is fixedly connected with the first portion of the tension-bearing member;
a second portion of the sleeve slidably engages a majority of the second portion of the tension-bearing member; and
the sleeve limits bending of the third portion of the tension-bearing member.

16. An apparatus comprising:
a downhole tool for coupling within a tool string conveyable within a wellbore extending into a subterranean formation, wherein the downhole tool comprises:
a tension-bearing member comprising:
a first portion;
a second portion comprising an a downward facing shoulder; and
a third portion between and narrower than the first and second thicker portions and operable to stretch when tension is applied to the tool string;
a load cell connected along the third portion and operable to generate information indicative of the tension applied to the tool string; and
a sleeve disposed at least partially about the tension-bearing member, wherein:
a first portion of the sleeve is fixedly connected with the first portion of the tension-bearing member;
a second portion of the sleeve slidably engages the second portion of the tension-bearing member;
a third portion of the sleeve comprises an inwardly extending shoulder;
the inwardly extending shoulder and the downward facing shoulder are configured to contact when a threshold tension is applied to the tool string thereby preventing the third portion of the tension-bearing member from further stretching; and
the second portion of the sleeve is located between the first and third portions of the sleeve.

17. The apparatus of claim 16 wherein the sleeve is configured to limit bending of the third portion of the tension-bearing member.

18. An apparatus comprising:
a tension sensing tool for coupling between opposing first and second portions of a tool string conveyable within a wellbore extending into a subterranean formation, wherein the tension sensing tool comprises:
   a tension-bearing member comprising a first portion, a second portion, and a third portion between and narrower than the first and second portions and operable to stretch when the tension is applied to the tension sensing tool, wherein a bore extends axially through the tension-bearing member;
   a load cell connected to an inner wall of the bore along the third portion, wherein the load cell is operable to generate information indicative of tension applied to the tension sensing tool; and
   electronic equipment communicatively connected with the load cell and operable to at least one of:
      record the information generated by the load cell; and
      transmit the information generated by the load cell to a wellsite surface from which the wellbore extends.

19. The apparatus of claim 18 wherein the tension sensing tool further comprises a sleeve disposed at least partially about the tension-bearing member, and wherein the sleeve is fixedly connected with the first portion and slidably engages the second portion.

20. The apparatus of claim 19 wherein the sleeve is fixedly connected with the first portion along a first axial distance, and wherein the sleeve slidably engages the second portion along a second axial distance that is greater than the first axial distance.

21. The apparatus of claim 19 wherein:
   a first portion of the sleeve is fixedly connected with the first portion of the tension-bearing member;
   a second portion of the sleeve comprises an inwardly extending shoulder;
   an intermediate portion of the sleeve located between the first and second portions of the sleeve slidably engages the second portion of the tension-bearing member;
   the second portion of the tension-bearing member comprises a downward facing shoulder; and
   the inwardly extending shoulder and the downward facing shoulder are configured to contact when a threshold tension is applied to the tension-bearing member thereby preventing the third portion of the tension-bearing member from further stretching.

22. The apparatus of claim 19 wherein the sleeve limits bending of the tension-bearing member at the third portion.

23. The apparatus of claim 19 wherein the tension sensing tool does not comprise a fluid seal between and sealingly engaging the sleeve and the second portion.

24. A method comprising:
conveying a tool string within a wellbore that extends into a subterranean formation, wherein the tool string comprises:
   a perforating tool operable to perforate the subterranean formation; and
   a tension sensing tool comprising:
      a tension-bearing member comprising:
         a first portion;
         a second portion comprising a downward facing shoulder;
         a third portion between and narrower than the first and second portions, wherein a bore extends axially through the tension-bearing member, and wherein the load cell is connected to an inner wall of the bore along the third portion; and
      a sleeve disposed at least partially about the tension-bearing member, wherein:
         a first portion of the sleeve is fixedly connected with the first portion of the tension-bearing member;
         a second portion of the sleeve slidably engages the second portion of the tension-bearing member;
         a third portion of the sleeve comprises an inwardly extending shoulder, and
         the second portion of the sleeve is located between the first and third portions of the sleeve;
      a load cell connected along the tension-bearing member; and
      a processing device;
supplying negative polarity electrical power to the load cell and the processing device from a wellsite surface from which the wellbore extends;
applying tension to the tool string thereby causing:
   the third portion of the tension-bearing member to stretch; and
   the inwardly extending shoulder and the downward facing shoulder to contact thereby preventing the narrower portion from further stretching;
operating the load cell to generate information indicative of the tension applied to the tool string;
operating the processing device to receive and process the information; and
transmitting the processed information to the wellsite surface.

* * * * *